No. 606,778. Patented July 5, 1898.
C. DIETZ.
SELF LOCKING COUPLING OR BEARING.
(Application filed Feb. 24, 1898.)
(No Model.) 2 Sheets—Sheet 1.

WITNESSES
J. A. Brodberger
P. R. Hargitt

INVENTOR
Conrad Dietz
BY James F. Ramsey
ATTORNEY

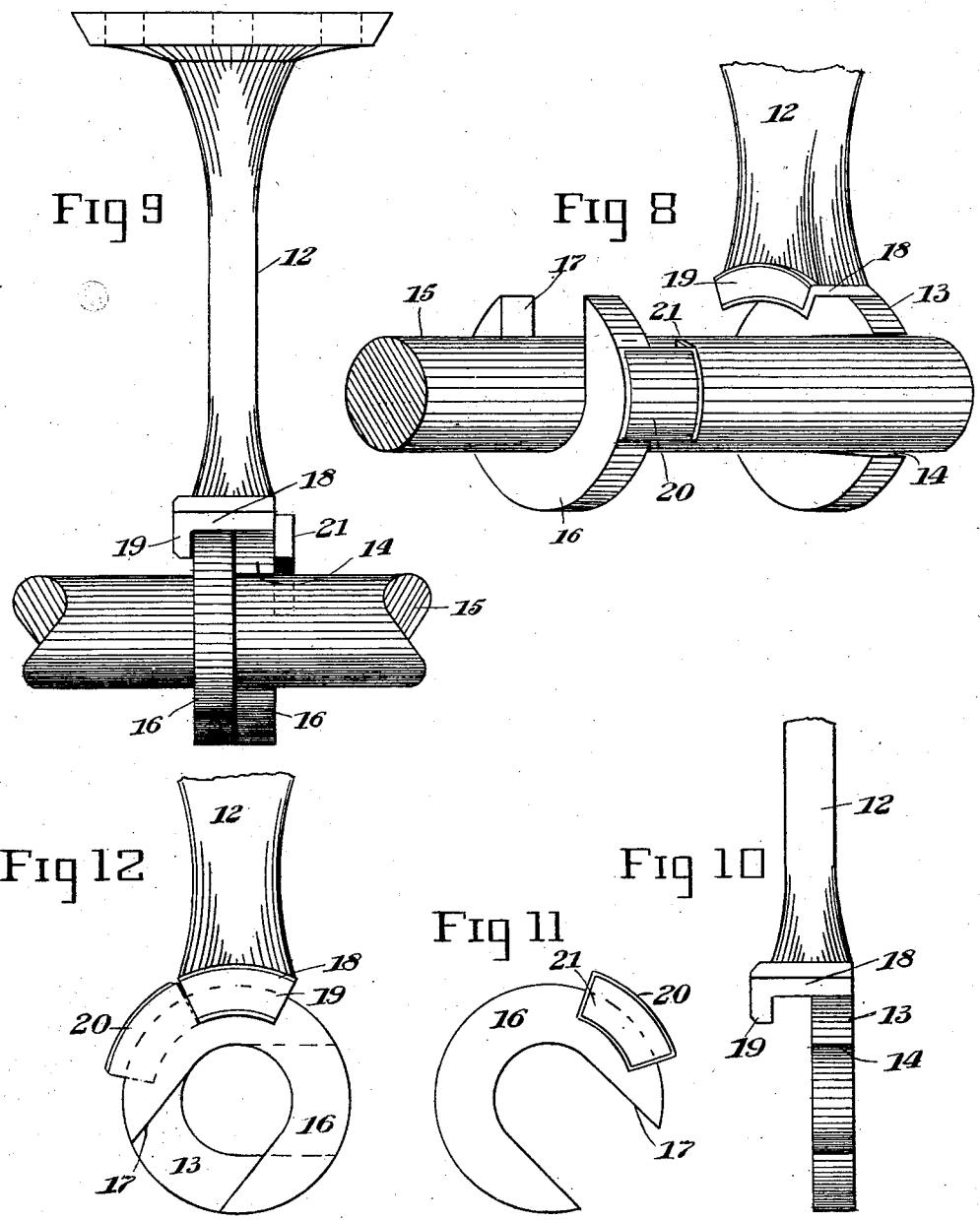

UNITED STATES PATENT OFFICE.

CONRAD DIETZ, OF CINCINNATI, OHIO.

SELF-LOCKING COUPLING OR BEARING.

SPECIFICATION forming part of Letters Patent No. 606,778, dated July 5, 1898.

Application filed February 24, 1898. Serial No. 671,464. (No model.)

*To all whom it may concern:*

Be it known that I, CONRAD DIETZ, a citizen of the United States, residing at Cincinnati, in the county of Hamilton and State of Ohio, have invented certain new and useful Improvements in Self-Locking Couplings or Bearings, of which the following is a specification.

My invention relates to improvements in coupling devices for connecting-rods, pitmen, shaft-hangers, and similar bars which it is desired to connect upon a crank or shaft between collars or upon a straight shaft.

The object of my invention is to construct and combine the parts or members to be mounted together upon the crank or shaft so that they may be attached thereto and to each other in such a manner that they will be interlocked by turning one of the parts or members relatively to the other, so as to hold them securely against disengagement and pivotally mounted on said shaft at the same time without the use of any supplemental or additional parts and may be detached from the crank or shaft and from each other by reversing the operation of attaching them.

My invention consists in a coupling formed of two parts or members each having a hook-like portion adapted to be engaged with a shaft or stud, which forms a journal upon which the parts or members are adapted for turning or rotative movement, one of said parts or members having a segment adapted, when one of said parts or members is turned or rotated upon the journal, to take over and engage the periphery of the other part or member, so as to hold the parts or members locked against removal from said shaft or stud.

My invention also contemplates certain novel features of the construction, combination, and arrangement of the several parts of the improved coupling, whereby certain important advantages are attained and the device is made simpler, cheaper, and otherwise better adapted and more convenient for use, all as will be hereinafter fully set forth.

The novel features of my invention will be carefully defined in the claims.

In order that my improvements may be the better understood, I have illustrated in the accompanying drawings several embodiments of the invention, in which—

Figure 1:
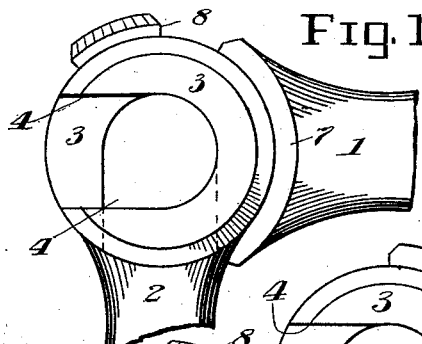
Figure 2:
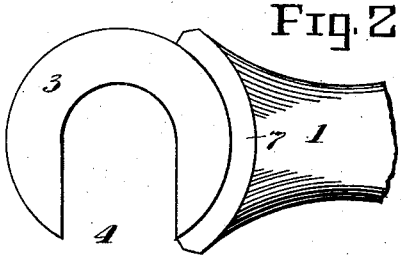
Figures 3, 4:
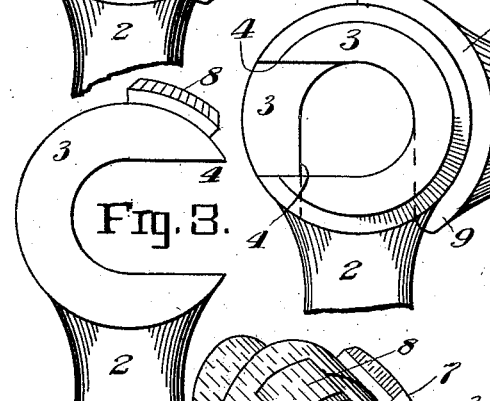
Figure 6:
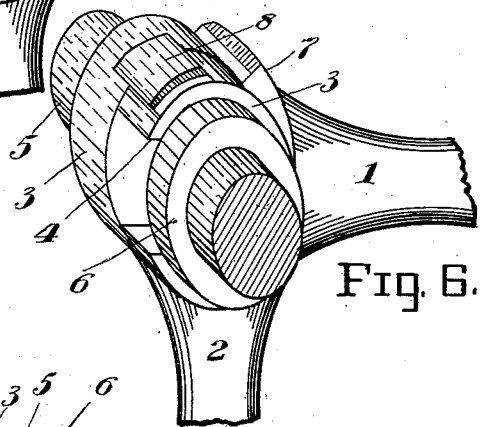
Figure 5:
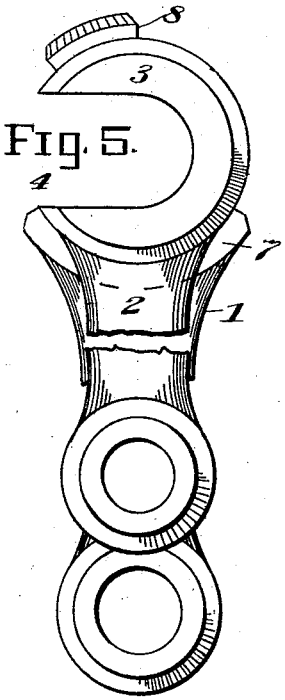
Figure 7:
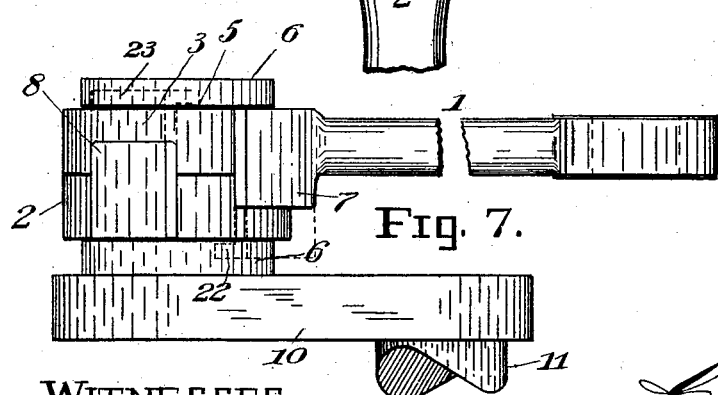

Figure 1 is a fragmentary elevation showing one form of the coupling adapted for connecting two rods together or to a common pivot. Fig. 2 is a view showing one side of one of the members of the coupling shown in Fig. 1, and Fig. 3 is a view showing the opposite side of the other member of said coupling. Fig. 4 is a view similar to Fig. 1, but showing a modified form of the coupling, wherein but one of the parts or members is provided with a locking-segment. Fig. 5 is a view of the coupling shown in Fig. 1, the parts or members being shown turned about so as to permit of engaging their hooked end portions simultaneously with the shaft or stud. Fig. 6 is a perspective view of the coupling shown in Figs. 1 and 5, the shaft or stud being shown engaged with the hooked end portions of the parts or members and said parts or members being shown turned about so as to interlock with each other. Fig. 7 is a plan view showing a coupling, such as is illustrated in Figs. 1 and 5, applied for use in connection with the wrist-pin of a crank. Fig. 8 is a perspective view showing another modified form of coupling adapted for use in connection with a shaft-hanger, and Fig. 9 is an edge view of the same device, the parts or members being shown as interlocked with each other as when in use. Figs. 10 and 11 are views showing the two parts or members of the coupling detached, and Fig. 12 is a face view showing said parts or members interlocked with each other.

Referring first to Figs. 1, 2, 3, 5, and 6, 1 indicates one of the parts or members of the coupling, herein shown as a pitman or connecting-rod, and 2 indicates the other part or member of the coupling, also formed, as shown herein, in the nature of a connecting-rod, these parts or members 1 and 2 being each provided with a hook-like end portion 3, adapted for engagement with a stud or shaft 5, (see Fig. 6,) which forms a fulcrum or pivot-point whereon the parts or members move. Each hook-like end portion 3 is formed with an opening or cut-away portion 4 at one side to permit the part or member of the coupling to be conveniently engaged with or disengaged from the stud or shaft 5, and on said stud or shaft are mounted set-collars or enlargements 6 6, adapted to receive the parts or members 1 and 2 between them, while preventing movement of said parts lengthwise along the stud or shaft.

In engaging the members of the coupling with the stud or shaft 5 they are first turned upon each other until the openings or cutaway portions 4 of their hook-like end portions 3 correspond and are in alinement with each other, as shown in Fig. 5, after which one of the members is turned so as to stand at angles to the other, as shown in Figs. 1 and 6, the openings 4 being then out of alinement.

To lock the parts or members 1 and 2 together when they are turned after engagement with the stud or shaft 5, I provide on the part or member 1 a segment 7, which projects laterally from one face of the hook-like end portion of said member in position to take over the periphery of the end portion 3 of the member 2, and on the part or member 2 I provide a similar projecting segment 8, adapted to take over the periphery of the hook-like end portion of the member 1. The segments 7 and 8 are so arranged that when the members of the coupling are turned so as to stand at angles to one another the segment on one member will stand opposite to the opening 4 of the hook-like end portion of the other member, as shown in Figs. 1 and 6, so that disengagement of the members of the coupling from the stud or shaft 5 will be prevented. Each of the segments 7 and 8 also forms a stop adapted by its engagement with the other member of the coupling to limit the turning or rocking movement of the members upon the shaft or stud 5. The collars 6 on the stud or shaft 5 hold the members against movement lengthwise on the shaft, so that the members cannot be disengaged while held in their angular position.

In Fig. 7 I have shown my improved coupling applied for connecting two rods or members to the wrist-pin of a crank, said wrist-pin taking the place of the stud or shaft 5 above referred to and being secured to the crank 10 on the shaft 11. Collars 6 are provided on the wrist-pin to hold the members or rods 1 and 2 against movement endwise upon the wrist-pin.

In Fig. 4 I have shown a modified form of the coupling, in which the segment on the end portion of the member 2 is omitted, the segment 7 upon the member 1 being made of increased length, so that when the members are at angles to each other one part of said segment 7 will stand opposite the opening 4 of the member 2, while the other end portion 9 of said segment 7 will by its engagement with the periphery of the end portion of the member 2 prevent disengagement of the member 1 from the shaft or stud 5, as will be readily understood. In this form of the coupling also the segment 7 by its engagement with the body portion of the member 2 of the coupling serves as a stop to prevent excessive turning movement of the members relatively to each other.

In Figs. 8 to 12 I have shown another form of the coupling adapted for use in connection with a shaft-hanger or the like, the collars 6, which prevent endwise movement of the coupling members along the shaft, being dispensed with. In this form of the device 12 indicates the body portion of the shaft-hanger, which is formed with a hook-like end portion 13, forming one member or part of the coupling, and provided at one side with an opening or cut-away portion 14 to permit of its engagement with the shaft 15. 16 indicates the other member of the coupling, this member being made in hook-like form, having an opening or cut-away portion 17 to permit its being engaged also with the shaft 15. The member 12 is formed with a laterally-projecting segment 18, adapted to take over the periphery of the part or member 16 when the members are placed together, as shown in Figs. 9 and 12, said segment 18 having its extremity formed with a depending portion or lug 19 to engage the side surface of the member 16 opposite the hook-like end portion 13 of the member 12. The hook-like member 16 is similarly formed with a projecting lateral segment 20, having a depending lug 21 to engage the side surface of the end portion 13 of the member 12 when the parts of the coupling are together. In this way it will be seen the lugs 19 and 21 prevent the parts or members of the coupling from being separated by movement endwise along the shaft 15, the segments 18 and 20 at the same time serving to prevent the members from being disengaged from the shaft when they have been turned to bring the openings 17 and 14 out of registry. The segments 18 and 20 also form stops adapted to engage each other, as shown in Fig. 12, to prevent excessive turning movement of the members.

From the above description it will be seen that the improved coupling constructed according to my invention is of an extremely simple and inexpensive nature and is especially well adapted for the purposes for which it is designed, since it permits the parts or members to be held securely locked in position, while permitting them to be readily disengaged by simply turning them so as to cause the openings of their end portions to come into registry.

It will also be obvious from the above description that the coupling constructed according to my invention is capable of considerable modification without material departure from the principles and spirit of my invention in order to adapt it for various uses, and for this reason I do not wish to be understood as limiting myself to the precise form and arrangement of the several parts herein set forth. For example, if desired, the segments 7 and 8 of the members 1 and 2 may, as shown in dotted lines in Fig. 7, be provided with lugs 22 and 23, similar to the lugs 19 and 21, to hold the members against movement endwise along the shaft 5 in lieu of the collars 6.

Having thus described my invention, what I claim, and desire to secure by Letters Patent, is—

1. A coupling comprising two parts or members each having a hook-like portion formed with an opening adapted to permit it to be engaged with a journal upon which the parts or members are adapted for turning or rotative movement, and the said journal, one of said parts or members having a laterally-projecting segment adapted, when one of the members is turned or rotated, to engage with the periphery of the hook-like portion of the other part or member to hold the parts or members locked in engagement upon the journal, substantially as set forth.

2. A coupling comprising two parts or members each having a hook-like portion formed with an opening adapted to permit it to be engaged with a journal upon which the parts or members are adapted for turning or rotative movement, the said journal, and means to prevent the parts or members from movement endwise along said journal when engaged therewith, one of said parts or members having a laterally-projecting segment adapted when one of the members is turned or rotated to engage with the periphery of the hook-like portion of the other part or member to hold the parts or members locked in engagement upon the journal, substantially as set forth.

3. A coupling comprising two parts or members each having a hook-like portion formed with an opening adapted to permit it to be engaged with a journal upon which the parts or members are adapted for turning or rotative movement, and the said journal, each of said parts or members having a laterally-projecting segment adapted when one of the members is turned or rotated to engage with the periphery of the hook-like portion of the other part or member to hold the parts or members locked against accidental disengagement from the journal, substantially as set forth.

4. A coupling comprising two parts or members each having a hook-like portion formed with an opening adapted to permit it to be engaged with a journal upon which the parts or members are adapted for turning or rotative movement, the said journal, one of said parts or members having a laterally-projecting segment adapted, when one of the members is turned at an angle to the other member, to engage with the periphery of the hook-like portion of such member to hold the parts or members locked against accidental removal from the journal, and having a lug adapted to prevent disengagement of the parts or members by movement from each other endwise along the journal when engaged therewith, substantially as set forth.

CONRAD DIETZ.

Witnesses:
JAMES N. RAMSEY,
J. B. RRODBERGER.